UNITED STATES PATENT OFFICE.

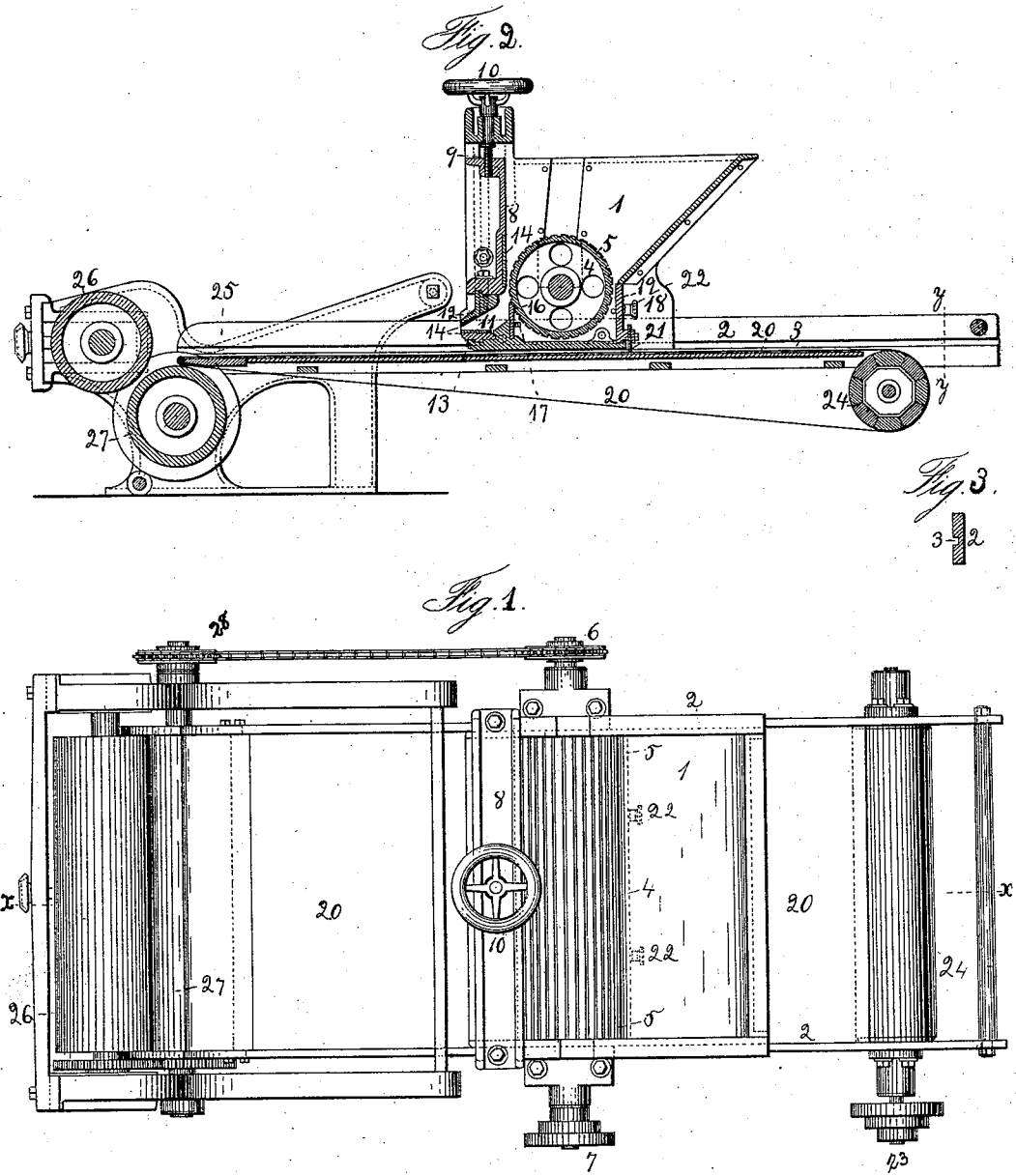

JAMES HENRY MITCHELL, OF PHILADELPHIA, PENNSYLVANIA.

CONTINUOUS DOUGH-PRESS FOR FORM-MAKING.

SPECIFICATION forming part of Letters Patent No. 472,765, dated April 12, 1892.

Application filed January 9, 1892. Serial No. 417,442. (No model.)

*To all whom it may concern:*

Be it known that I, JAMES HENRY MITCHELL, a citizen of the United States, residing at Philadelphia, in the county of Philadelphia and State of Pennsylvania, have invented a new and useful Improvement in Continuous Dough-Presses for Form-Making, of which the following is a specification.

My invention relates especially to dough-forming presses to be used in combination with sheeting-rolls of pan and scrap machines, and has for its object the provision of a device for making what is technically known as "dough-forms" and feeding the same automatically between the sheeting-rolls of a pan and scrap machine continuously and without breaking the forms.

To attain the desired end, my invention consists, essentially, in certain novel and useful combinations or arrangements of parts and peculiarities of construction and operation, all of which will be hereinafter first fully described, and then pointed out in the claims.

In the drawings, Figure 1 is a plan view of my device. Fig. 2 is a longitudinal sectional view at line $x\ x$ of Fig. 1. Fig. 3 is a cross-sectional view of one of the sides and slideways at line $y\ y$ of Fig. 2.

Similar numerals of reference wherever they occur indicate corresponding parts in all the figures.

1 is a hopper of a continuous dough-press mounted in the sides 2 of the main frame upon supports at the base of the hopper-frame, which extends into grooves 3 in the sides 2, permitting the hopper and connected parts to be moved longitudinally upon the main frame.

4 is a roller mounted in the hopper-frame, said roller being provided with longitudinal grooves 5 or pockets, as set forth and described in Letters Patent No. 443,862, issued to me December 30, 1890. The shaft of roller 4 bears a sprocket-wheel 6 for driving the same, or said roll may be driven in any suitable manner. The opposite end of the shaft of roll 4 bears a cone-pulley 7.

The front piece 8 of the hopper 1 is made vertically adjustable by means of a screw 9 and hand-wheel 10, whereby the size of the discharge-opening from the compressing-chamber 11 may be easily regulated. I have found that the wall of the opening between the front of the hopper and the compressing-roll should be made as nearly frictionless as possible, and also the width of the opening therebetween should be unalterable, as thereby the best results will be obtained, and the flow of dough should be regulated by increasing or decreasing the speed of rotation of the compressing-roll, instead of by the old method of regulating the width of the passage.

12 is an inclined removable plate secured to the lower edge of the hopper-front 8, and 13 is a bottom plate removably secured in the hopper-frame below the movable front piece, as particularly illustrated in Fig. 2. In order to make the fixed wall of the hopper-front as nearly frictionless as possible, I place upon said front opposite to the compressing-roll a piece of hard vulcanite rubber, gutta-percha, or other equivalent material 14, as I have discovered that such material will allow the dough to slide over it without adhesion.

A mechanical device for obtaining like results might consist of a friction-roller smaller in diameter than the compressing-roll, turning freely upon a shaft mounted in the hopper-frame or front plate; but I prefer a plate, as hereinbefore described. The walls of the compressing-chamber 11, especially near the outlet, are lined with material, as before set forth, to reduce the friction.

16 is a knife or scraper forming the rear of the compressing-chamber. This knife is provided with set-screws 17, by which any wear of either the knife or the periphery of the compressing-roll may be taken up. The dough is compressed within the chamber 11 by the continuous flow from the hopper above produced by the rotation of the fluted compressing-roll, and is caused to flow smoothly and continuously from said chamber 11 onto the carrying belt or apron.

The side plates of the hopper are carried backward near the bottom, as at 18, and, together with a removable plate 19, form a flour-hopper arranged to keep the apron 20 at all times thoroughly floured, the excess of flour being held back and scraped from the apron by a flexible lip 21, secured to plate 19 and having its lower edge in contact with the apron. As the apron 20 moves forward the flour is kept in the hopper, and it is not necessary to confine the same at the rear. By my peculiar arrangement of the hopper-frame beneath the compressing-roll, completely closing the space therebeneath, any dough, &c., which leaks or passes between scraper 16 and the periphery of the compressing-roll will accumulate until it is carried back into the hopper at the rear of said roll by the rotating of the roll. When it is desired to clean out the space beneath roll 5, the plate 19 is lifted out of place by means of the knobs 22.

The belt or apron 20 is driven by means of a band passing from the cone-pulley 7 to a similar pulley 23, mounted upon the shaft of a drum 24. Apron 20 passes around said drum beneath the form-press and around a piece 25 in the main frame, thus carrying the dough-forms to the sheeting-rolls. 26 and 27 are a pair of sheeting-rolls, the shaft of roll 26 bearing a sprocket-wheel 28, a chain being employed for transmitting power therefrom to the wheel 6 upon the compressing-roll shaft.

When it is desired to use the sheeting-rolls for any purpose independent of the form-press, said press is disconnected from the driving-chain and pushed to the right, out of the way.

My device is designed for use with any form of pan and scrap machine.

Having now fully described my invention, what I claim as new therein, and desire to secure by Letters Patent, is—

1. The combination, with a supporting-frame provided with slideways and a receiving-apron, of a continuous dough form-press movably mounted in said slideways and a pair of sheeting-rolls, arranged substantially as shown and described.

2. In a device of the character herein specified, the combination, with a compressing-roll, of a hopper located above the plane of its axis and a compressing-chamber located below the plane of the axis of the compressing-roll, said compressing-chamber having a narrow throat provided with a friction-reducing plate fixed therein opposite to the compressing-roll, substantially as and for the uses and purpose shown and described.

3. In a device of the character herein specified, a casing beneath the compressing-roll, adapted and arranged to receive escaping dough and permit the same to be automatically returned to the feed-hopper, substantially as shown and described.

JAMES HENRY MITCHELL.

Witnesses:
FRANK H. MASSEY,
FRANK R. JORDAN.